Figure 1:
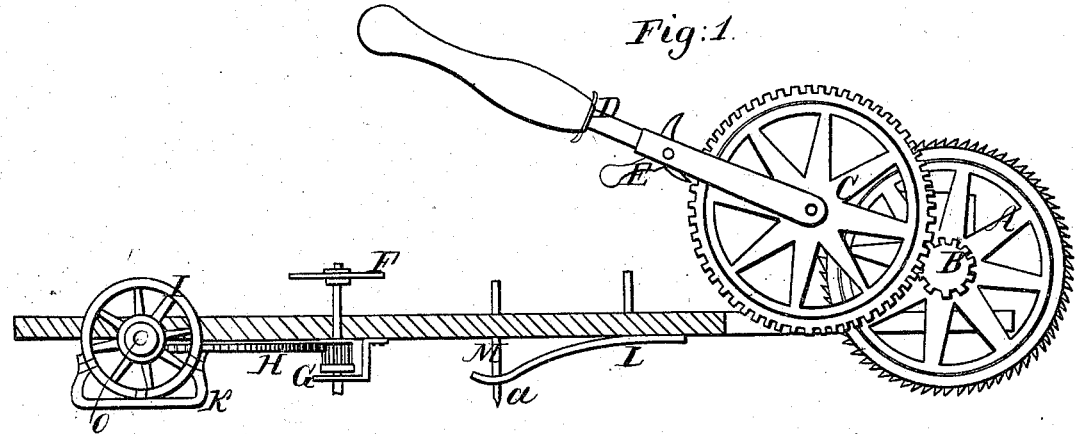

H. C. Moore.
Velocipede.
No. 75,953. Patented Mar. 24, 1868.

Inventor;
H. C. Moore.
by atty's
Gardner & Hyde

United States Patent Office.

H. C. MOORE, OF SPRINGFIELD, MASSACHUSETTS, ASSIGNOR TO HIMSELF AND P. H. DERBY, OF SAME PLACE.

Letters Patent No. 75,953, dated March 24, 1868.

IMPROVEMENT IN ICE-CARRIAGES.

The Schedule referred to in these Letters Patent and making part of the same.

TO ALL WHOM IT MAY CONCERN:

Be it known that I, H. C. MOORE, of Springfield, Hampden county, Commonwealth of Massachusetts, have invented a new and useful Improved Power Ice-Carriage, of which the following is a full and clear description, reference being had to the accompanying drawings, and to the letters of reference marked thereon. In the drawings—

Figure 2:
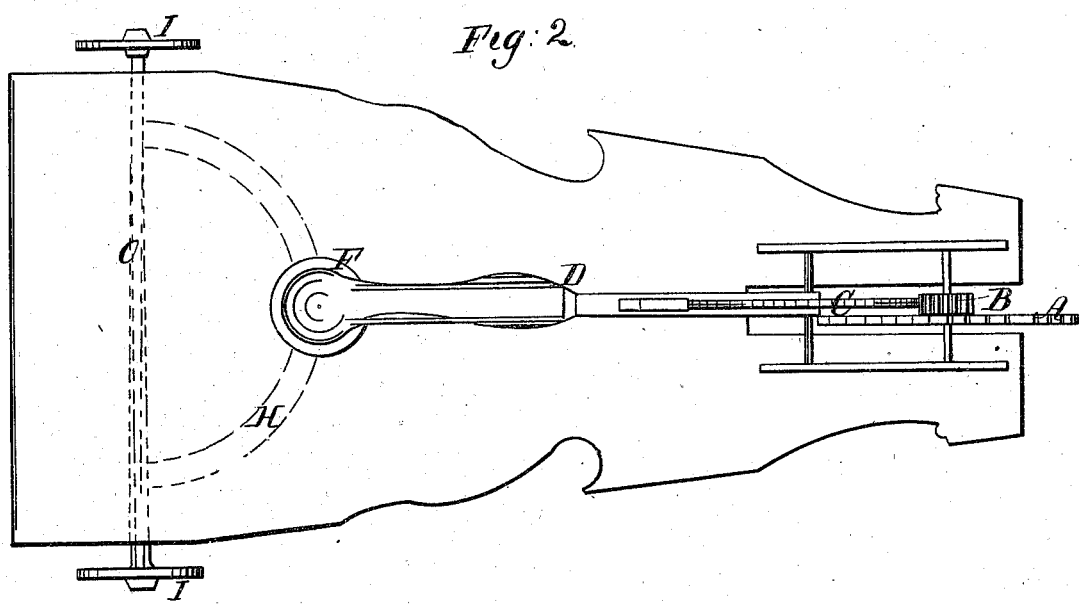

Figure 1 is a side view with a partial section, and
Figure 2 a plan view of my invention.

This device consists of the arrangement of a toothed wheel upon a suitable platform, in combination with gearing and a lever conveniently arranged to be operated by persons on the platform, the platform being supported by the said toothed wheel and a pair of wheels arranged upon an axle, pivoted at the other end of the carriage and operated to steer the carriage, by means of a hand-wheel upon the top of the platform, as will be hereafter more fully described.

In the drawings, A is the toothed wheel, placed at one end of the platform, and supporting this end of the same. Upon the shaft of the wheel A is the pinion B, which meshes into the gear-wheel C, the latter being operated immediately by the lever D, by means of a pawl, E, acting upon the gear-wheel as a ratchet to turn the same when the lever D is worked up and down, and thus turning the wheel A by the intermediate gearing, and moving the carriage along as the wheel A is revolved, the teeth of the same catching upon the ice and preventing it from slipping. Upon the opposite end of the carriage is arranged the steering-apparatus, before mentioned, and consisting of the axle O with wheels I and I. Upon the axle O is a rack, H, forming the arc of a circle, and operated by a pinion, G, upon the vertical shaft of the hand-wheel F, the axle being pivoted at the centre upon the platform of the carriage. The wheels I and I may be provided with runners or shoes, K and K, so that the vehicle can be used as a sled or car. A brake is formed for the same in the following manner: A spring-piece, L, is attached at one end to the under side of the platform, the other end bending downwards, and through which is fastened an upright rod, M, which passes up through the platform, projecting on the upper side of the same. The lower end of this rod is sharpened at $a$, so that, when pressed down while the vehicle is in motion, it digs into the ice or ground, and stops further progress. This operation may be performed by having the upper end of the rod M immediately under the handle of the propelling-lever, D, so that, by pressing the latter down, it also presses down the rod M, the spring L recovering it to its first position when pressure is taken off from the top.

It will be seen that, although especially designed for travelling upon ice, this device may be used on land, if desired, and the arrangement of the lever and gearing renders it possible to obtain great speed with comparatively a small expenditure of power.

The ratchet upon the lever D may be constructed so as to catch either way in the gear-wheel C, and turn the same backwards or forwards by the same motion of the lever, according to the adjustment of the ratchet.

Now, having described my invention, what I claim as new, and desire to secure by Letters Patent, is—

1. The arrangement of the toothed wheel A with pinion B, and the gear-wheel C operated by lever D, in combination with the hand-wheel F, with pinion G and the rack H, upon the pivoted axle O, substantially as shown and for the purpose set forth.

2. The brake, consisting of the vertical rod M and spring L, constructed and arranged as described.

H. C. MOORE.

Witnesses:
EDWARD H. HYDE,
CHAS. T. WORK.